US012688957B2

(12) United States Patent
Tang et al.

(10) Patent No.: US 12,688,957 B2
(45) Date of Patent: Jul. 21, 2026

(54) THERMALLY PROTECTED METAL OXIDE VARISTOR

(71) Applicant: Dongguan Littelfuse Electronics Company Limited, Dongguan (CN)

(72) Inventors: Hailang Tang, Dongguan (CN); Dongjian Song, Dongguan (CN); Charles Hu, Dongguan (CN)

(73) Assignee: Dongguan Littelfuse Electronics Company Limited, Dongguan (CN)

( * ) Notice: Subject to any disclaimer, the term of this patent is extended or adjusted under 35 U.S.C. 154(b) by 467 days.

(21) Appl. No.: 18/486,277

(22) Filed: Oct. 13, 2023

(65) Prior Publication Data

US 2024/0127990 A1 Apr. 18, 2024

(30) Foreign Application Priority Data

Oct. 14, 2022 (CN) ........................ 202211259627.X

(51) Int. Cl.
*H01C 7/12* (2006.01)
*H01C 1/14* (2006.01)

(52) U.S. Cl.
CPC ................. *H01C 7/12* (2013.01); *H01C 1/14* (2013.01)

(58) Field of Classification Search
CPC ........ H01C 1/144; H01C 7/112; H01C 7/126; H01C 7/102; H01C 1/02; H01C 7/12; H01C 1/14
See application file for complete search history.

(56) References Cited

U.S. PATENT DOCUMENTS

| | | | | |
|---|---|---|---|---|
| 7,741,946 B2 * | 6/2010 | Ho | ......................... | H01C 7/102 337/5 |
| 2009/0027153 A1 * | 1/2009 | Ho | ......................... | H01C 7/102 337/5 |
| 2019/0318853 A1 | 10/2019 | Ravindranathan | | |
| 2021/0012933 A1 | 1/2021 | Yang | | |

FOREIGN PATENT DOCUMENTS

| | | | | |
|---|---|---|---|---|
| CN | 212294168 U * | 1/2021 | | |
| CN | 110120619 B * | 1/2022 | ............ | F21V 21/002 |
| EP | 2194541 A2 * | 6/2010 | ......... | C04B 35/6261 |
| WO | 2019071588 A1 | 4/2019 | | |
| WO | 2020000181 A1 | 1/2020 | | |

OTHER PUBLICATIONS

CN-212294168 translation (Year: 2021).*
CN-110120619 translation (Year: 2022).*
Extended European Search Report and European Search Opinion for Application No. EP 23203715.0 mailed Mar. 13, 2024; 8 pages.

* cited by examiner

*Primary Examiner* — Kyung S Lee
(74) *Attorney, Agent, or Firm* — KDW Firm PLLC

(57) ABSTRACT

A metal oxide varistor (MOV) includes an MOV body, a first electrode, a second electrode, and a thermal cut-off insulation shell. The MOV body is a crystalline microstructure with zinc oxide mixed with one or more other metal oxides. The first electrode is adjacent one side of the MOV body and is connected to a first radial lead. The second electrode is adjacent a second side of the MOV body and is connected to a second radial lead having a curved portion. The thermal cut-off insulation shell is adjacent the second electrode and has a protrusion, with the curved portion of the second radial lead being adjacent the protrusion.

9 Claims, 16 Drawing Sheets

THERMALLY PROTECTED METAL OXIDE VARISTOR

CROSS-REFERENCE TO RELATED APPLICATIONS

This application claims the benefit of priority to, Chinese Patent Application No. 202211259627X, filed Oct. 14, 2022, entitled "Thermally Protected Metal Oxide Varistor," which application is incorporated herein by reference in its entirety.

FIELD OF THE DISCLOSURE

Embodiments of the present disclosure relate to metal oxide varistors (MOVs) and, more particularly, to radial lead MOVs.

BACKGROUND

Overvoltage protection devices are used to protect electronic circuits and components from damage due to overvoltage fault conditions. The overvoltage protection devices may include metal oxide varistors (MOVs), connected between the circuits to be protected and a ground line. The MOV includes a crystalline microstructure that allows the MOV to dissipate very high levels of transient energy across the entire bulk of the device.

MOVs are typically used for the suppression of lightning and other high energy transients found in industrial or AC line applications. Additionally, MOVs are used in DC circuits such as low voltage power supplies and automobile applications. Their manufacturing process permits many different form factors with radial leaded discs being the most common. Under an abnormal overvoltage condition, the MOV may catch fire. Or the epoxy coating of the MOV may burn due to overheating of the MOV.

A thermally protected MOV (TMOV) additionally includes an integrated thermally activated element, such as a thermal cut-off (TCO) wire, that is designed to break in the event of overheating due to the abnormal overvoltage event. The TCO wire will melt and flow onto the MOV electrode to form an open circuit. Occasionally, the random flow of the TCO wire will cause the separated molten wires to reconnect, which also may cause a fire.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a metal oxide varistor (MOV) in accordance with the present disclosure may include an MOV body, a first electrode, a second electrode, and a thermal cut-off insulation shell. The MOV body is a crystalline microstructure with zinc oxide mixed with one or more other metal oxides. The first electrode is adjacent one side of the MOV body and is connected to a first radial lead. The second electrode is adjacent a second side of the MOV body and is connected to a second radial lead having a curved portion. The thermal cut-off insulation shell is adjacent the second electrode and has a protrusion, with the curved portion of the second radial lead being adjacent the protrusion.

Another exemplary embodiment of an MOV in accordance with the present disclosure may include an MOV body, a first electrode, a second electrode, and a thermal cut-off insulation shell. The MOV body is a crystalline microstructure with zinc oxide mixed with one or more other metal oxides. The first electrode is adjacent one side of the MOV body and is connected to a first radial lead. The second electrode is adjacent a second side of the MOV body and is connected to a second radial lead having a circular portion. The thermal cut-off insulation shell is adjacent the second electrode and has a protrusion, with the circular portion of the second radial lead surrounding the protrusion.

DETAILED DESCRIPTION

A thermally protected metal oxide varistor (TMOV) for providing overvoltage protection is disclosed. The TMOV includes a thermal cut-off insulation shell and a phosphor copper wire with an interesting shape. In one embodiment, the phosphor copper wire has a curved portion that looks like a C, in a second embodiment, the phosphor copper wire has a circular portion. The thermal cut-off insulation shell includes one or more protrusions designed to hold the phosphor copper wire in place. Further, the thermal cut-off insulation shell has an aperture through which the phosphor copper wire is disposed at one end for connection to an electrode of the MOV as well as a radial lead, using a low melting temperature solder. Upon the occurrence of an abnormal overvoltage or overtemperature event, the solder melts and the phosphor copper wire is disconnected from the electrode.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1A:
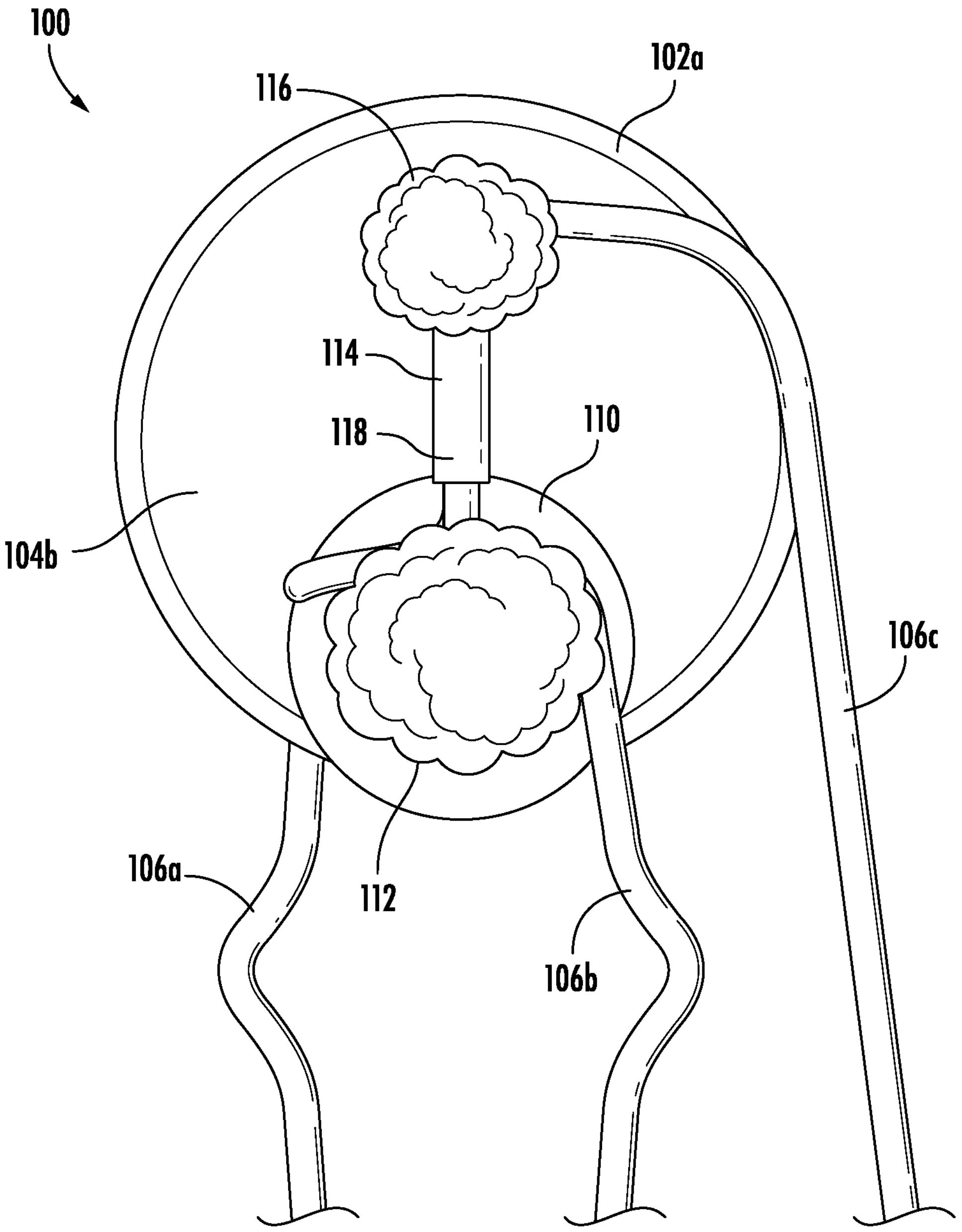
FIG. 1A (PRIOR ART)
FIGS. 1A-1D are diagrams illustrating a thermal metal oxide varistor (TMOV), in accordance with the prior art.
Figure 1B:
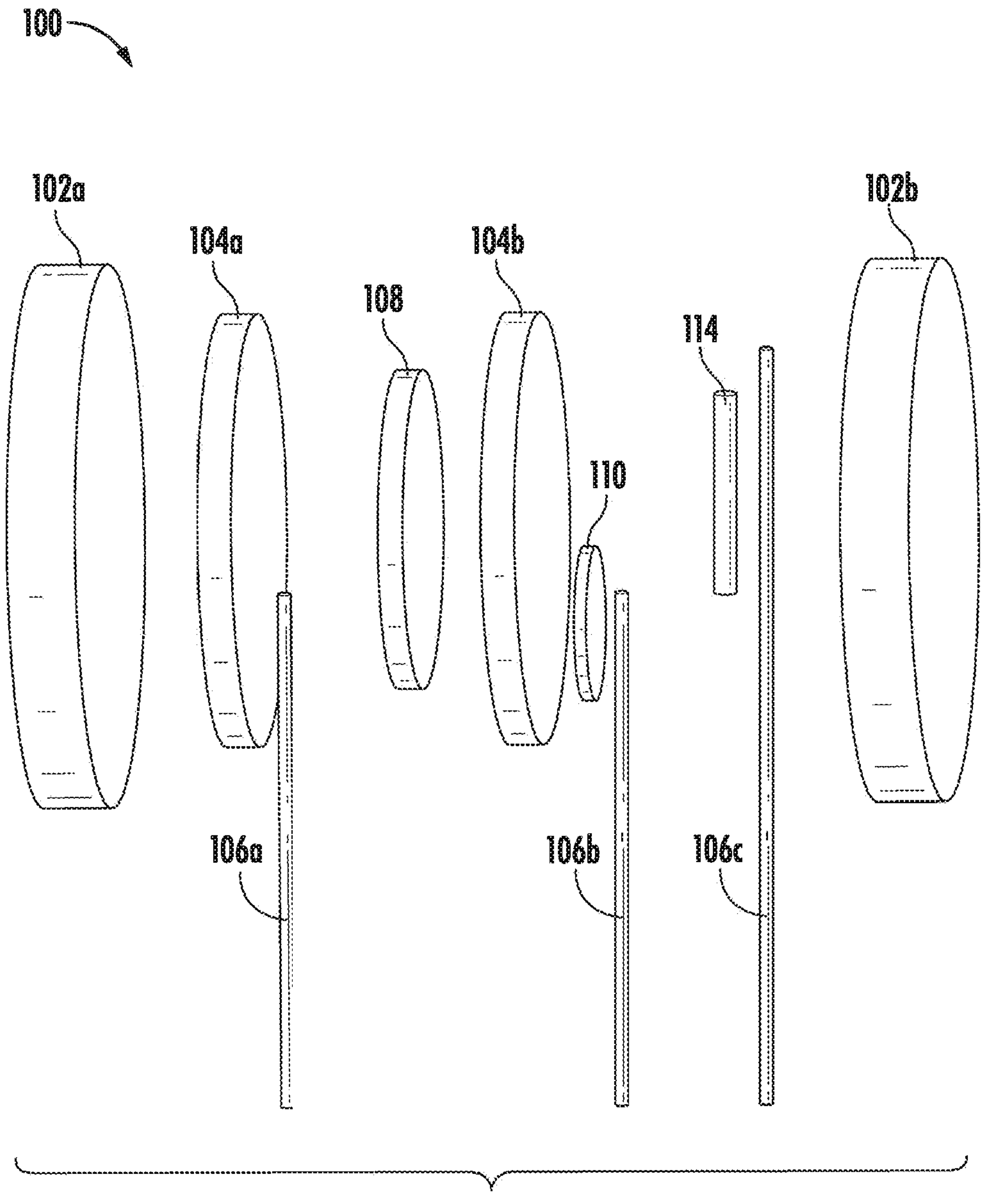
FIG. 1B (PRIOR ART)
Figure 1C:
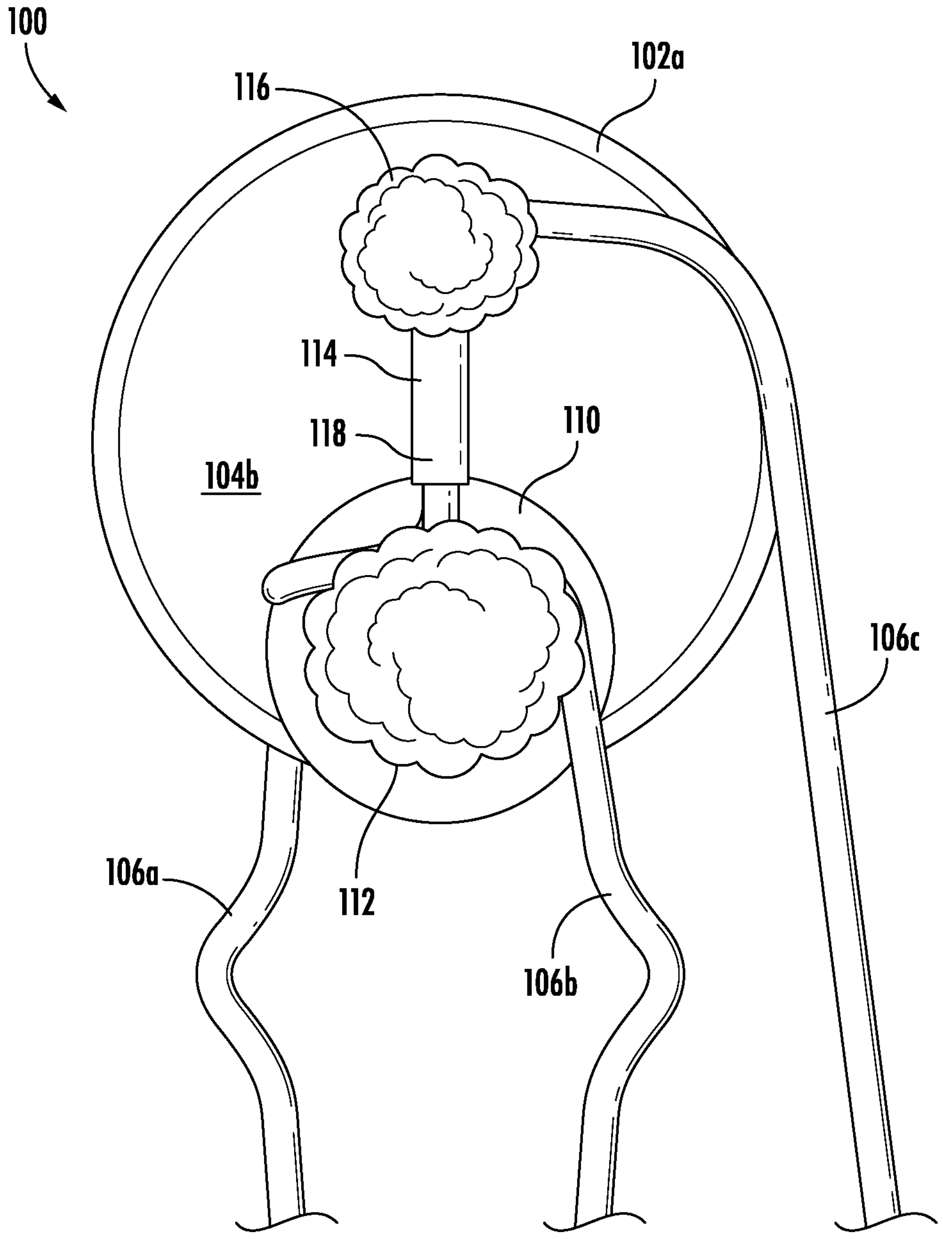
FIG. 1C (PRIOR ART)
Figure 1D:
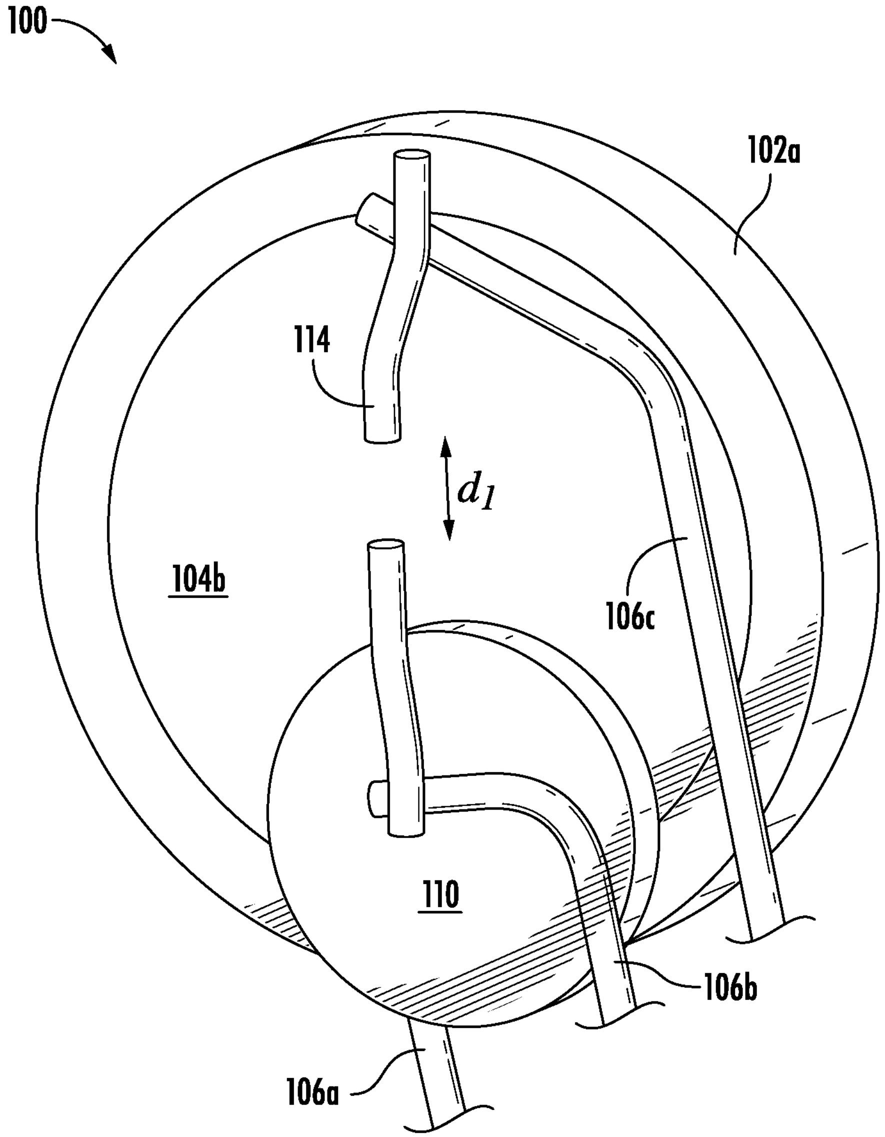
FIG. 1D (PRIOR ART)

FIGS. 1A-1D are representative drawings of a thermally protected metal oxide varistor (TMOV) 100 for providing overvoltage protection, according to the prior art. FIG. 1A is a plan view, FIG. 1B is an exploded perspective view, FIG. 1C is a second plan view, and FIG. 1D is a perspective view of the TMOV 100. The TMOV 100 is an example of a radial leaded disc type of MOV. The TMOV 100 includes a first ceramic resistor 102*a* and a second ceramic resistor 102*b* (FIG. 1B) (collectively, "ceramic resistor(s) 102"). The two ceramic resistors 102 surround and contain the other components of the TMOV 100. Looking particularly at FIG. 1B, the ceramic resistors 102 house two electrodes 104*a* and 104*b* (collectively, "electrode(s) 104") with a MOV body 108 sandwiched between the two electrodes. The MOV body 108 is a crystalline microstructure featuring zinc oxide mixed with one or more other metal oxides that allows the TMOV 100 to dissipate high levels of transient energy across the bulk of the device. Put another way, the MOV body 108 has a matrix of conductive zinc oxide grains separated by grain boundaries, providing P-N junction semiconductor characteristics, with the boundaries blocking conduction at low voltages and being the source of nonlinear electrical conduction at higher voltages. Both sides of the ceramic resistor 102 are to be covered in an encapsulant, such as epoxy (not shown). The epoxy may be a liquid crystal polymer (LCP) or polyphenylene sulfide (PPS), as two examples.

An electrode 104*b* is visible in FIGS. 1A and 1C while electrode 104*a* is shown in FIG. 1B. The ceramic resistor 102*b* and MOV body 108 are visible in the exploded view of FIG. 1B. The electrode 104*a* is affixed to ceramic resistor 102*a* while electrode 104*b* is affixed to ceramic resistor 102*b*, with the MOV body 108 being disposed the two electrodes. The ceramic resistors 102, the electrodes 104, and the MOV body 108 are each substantially circular disc-shaped, with the ceramic resistors having a slightly larger radius than the electrodes, though each of these components may alternatively assume non-circular shapes. The radial edge of ceramic resistor 102*a* is visible "behind" the electrode 104*b* in FIG. 1A.

The TMOV 100 features lead wires 106*a-c* extending radially outward from the ceramic resistor 102 (collectively, "lead wires 106"). A first lead wire 106*a* extends downward on one side (left side in FIG. 1A) of the ceramic resistor 102, a second lead wire 106*b* extends downward in the center of the ceramic resistor, and a third lead wire 106*c* extends downward on the other side (right side in FIG. 1A) of the ceramic resistor, with the second lead wire being disposed between the first and third lead wires. The lead wire 106*a* connects to electrode 104*a*, (FIG. 1B) which is "behind" the electrode 104*b* in FIG. 1A, while the lead wires 106*b* and 106*c* connect to the electrode 104*b*. The lead wire 106*c* may be connected to monitoring circuitry (not shown), thus providing an indication when the TMOV 100 is disconnected from a circuit. The lead wires 106 are made from an electrically conductive material, such as copper, and may be tin plated.

The lead wire 106*b* connects to a thermal cut-off (TCO) 114 wire at a thermal link 118, while the other side of the TCO is connected to the electrode 104*b* at a soldering joint 116. The TCO 114 is electrically connected in series to the MOV body 108. While the MOV body 108 enables the TMOV 100 to operate as a surge suppressor, the TCO 114 provides integrated thermal protection which breaks, thus creating an open circuit within the TMOV in the event of overheating due to sustained overvoltages. During normal operation, a current flowing through the TMOV 100 travels from the lead wire 106*b*, through the TCO 114, through the electrode 104*b*, through the MOV body 108, to the other electrode 104*a*, and finally to the lead wire 106*a*, and vice-versa.

An alumina oxide sheet 110 made up of alumina flakes is disposed beneath the lead wire 106*b* and adjacent the electrode 104*b*. A hot melt glue 112 is deposited over the alumina oxide sheet 110 to fix the alumina oxide sheet in place. The TCO 114 is connected to the electrode 104*b* by a soldering joint 116. During sustained over-voltage conditions, the soldering joint 116, the TCO 114, and the hot melt glue 112 becoming molten and break connection to the lead wire 106*b*, resulting in an open circuit within the TMOV 100.

The exploded view in FIG. 1B is somewhat exaggerated, as the electrodes 104 and alumina oxide sheet 110 of the TMOV 100 are usually quite thin sheets of electrically conductive material. The alumina oxide sheet 110 is also quite thin. Different materials can be used to make the electrodes 104, such as silver, copper, aluminum, nickel, or combinations of these materials. However, these electrically conductive materials have different properties, such as their melting points. Silver, for example, has a lower melting point than copper.

FIG. 1D shows the TMOV 100 in which a breakage of the TCO 114 has occurred. Once broken, there is a gap having dimension, $d_1$, between two portions of the TCO 114. Because the TMOV 100 is quite small, the gap is also quite small. Thus, despite the TCO 114 breaking, as designed, some of the melted wire may be deposited in the gap, allowing current to travel across the broken portions of the TCO 114. When this occurs, the TCO 114 has not served its intended function and the TMOV 100 may catch fire. Further, the epoxy coating of the TMOV 100 may burn due to overheating of the MOV body 108.

Figure 2A:
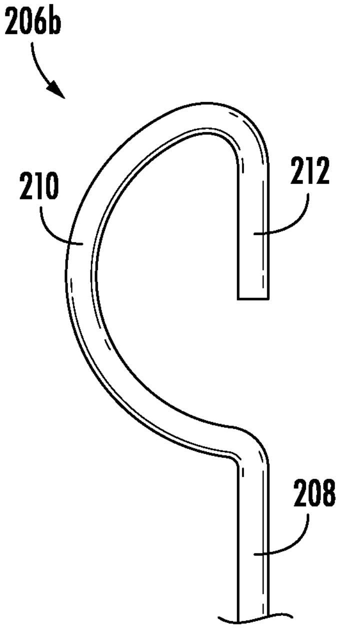
FIGS. 2A-2G are diagrams illustrating an enhanced TMOV, in accordance with exemplary embodiments.
Figure 2C:
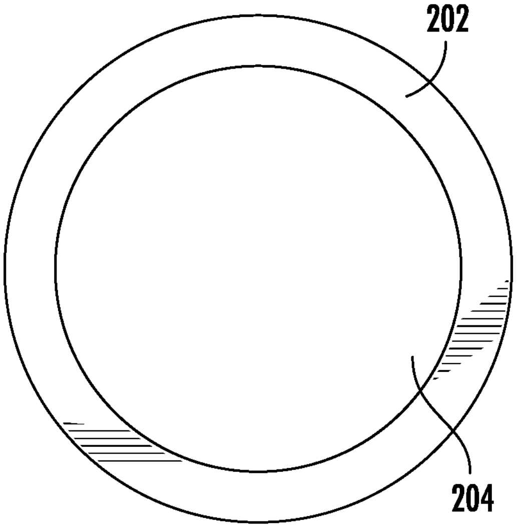
Figure 2B:
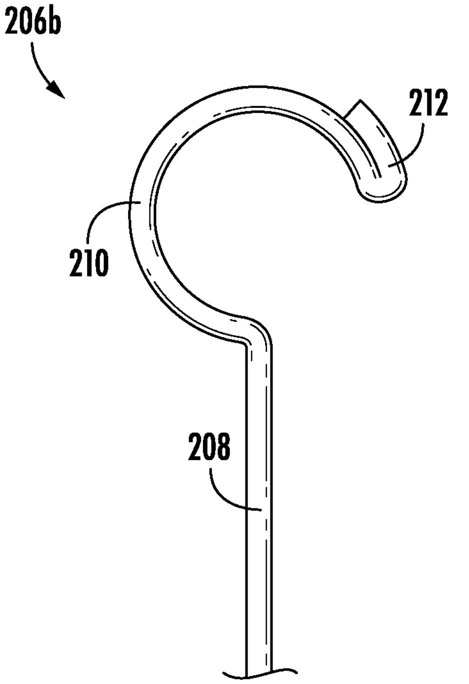
Figure 2D:
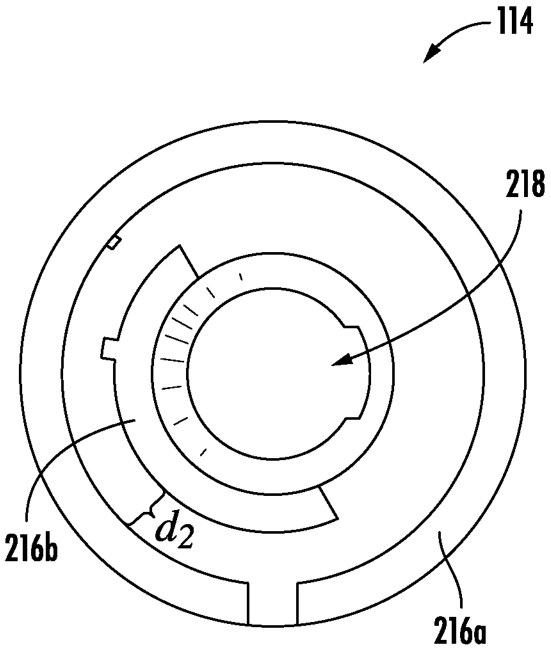
Figure 2F:
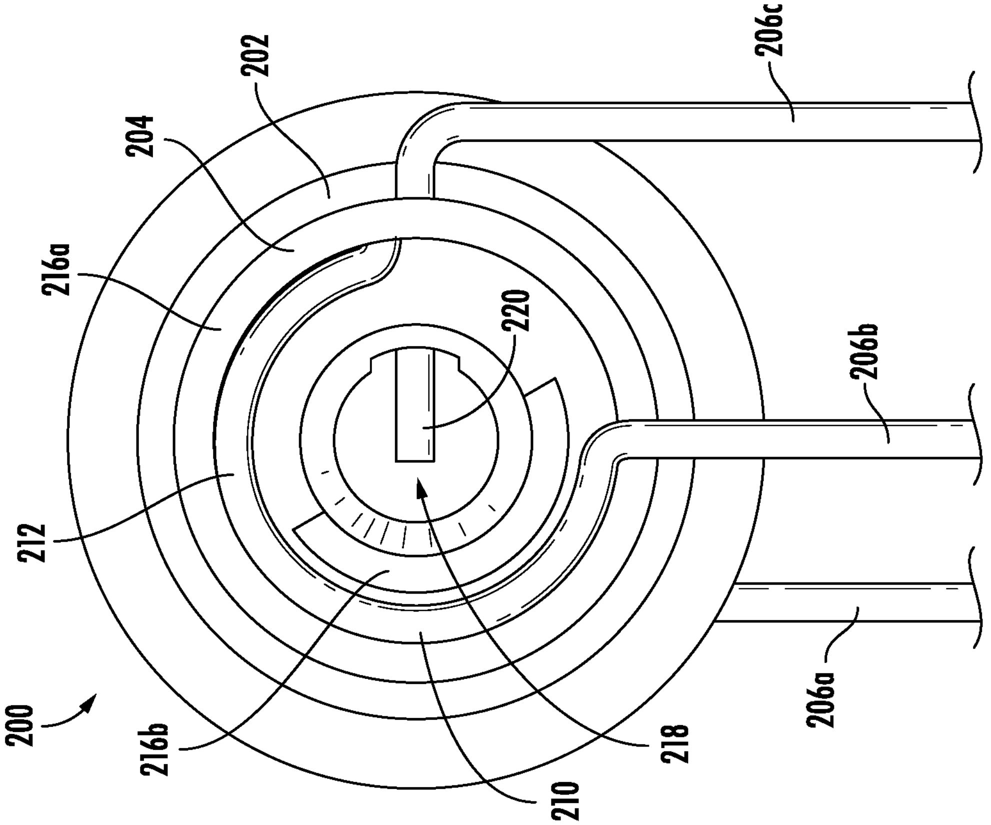
Figure 2E:
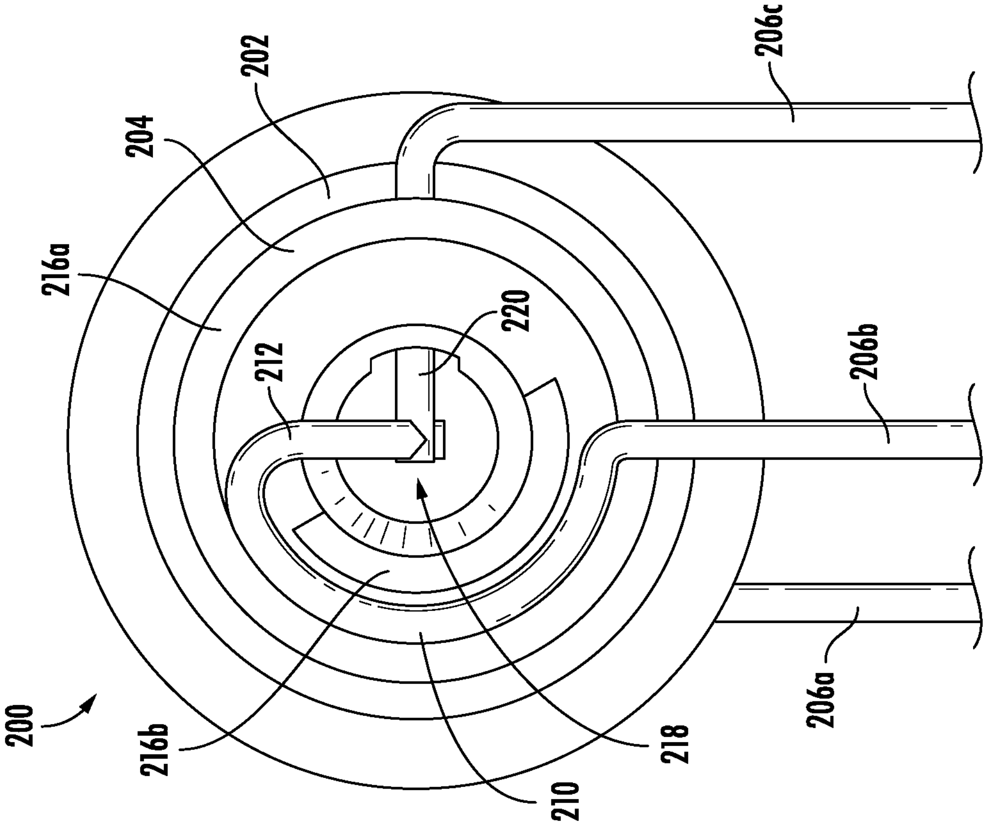
Figure 2G:
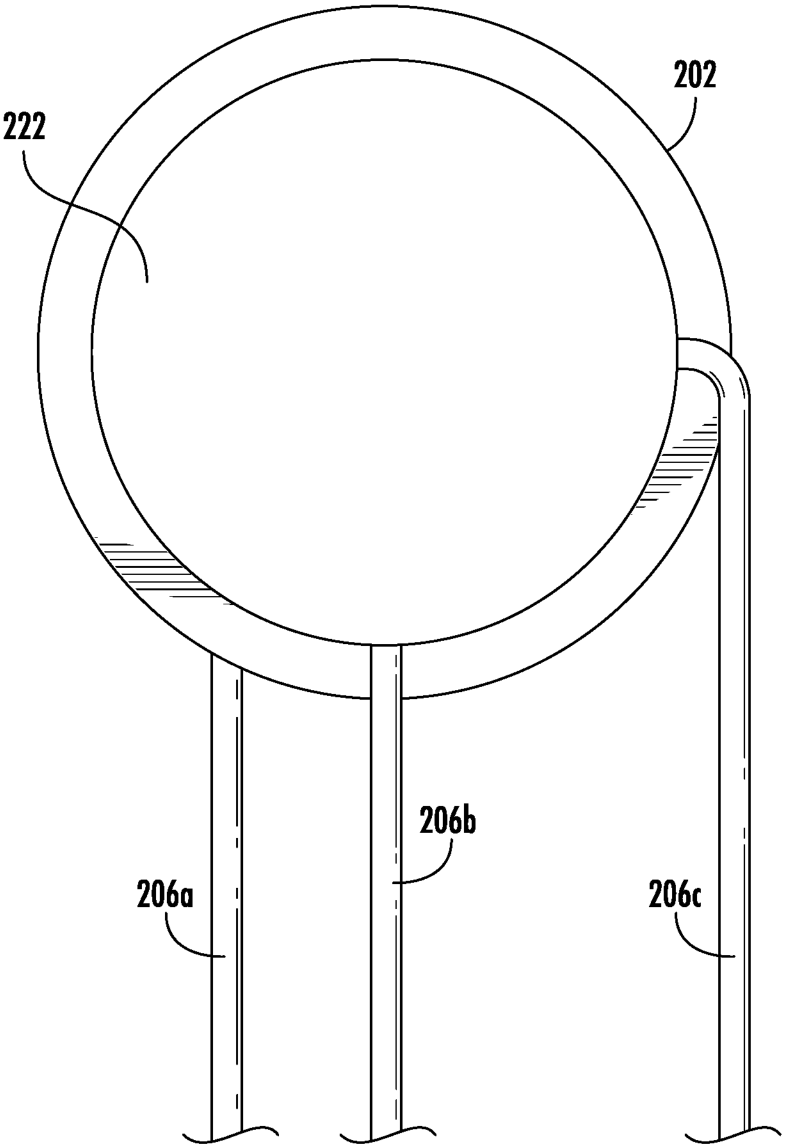

FIGS. 2A-2G are representative drawings of an enhanced TMOV 200, according to exemplary embodiments. FIGS. 2A and 2B are plan views of phosphorus copper wire, FIG. 2C is a plan view of the MOV, and FIG. 2D is a plan view of a TCO insulation shell, and FIG. 2G is a plan view of a lid, all of which are part of the enhanced TMOV 200; FIG. 2E is a plan view of the TMOV 200 before the solder joint is broken, and FIG. 2F is a plan view of the TMOV after the solder joint is broken. These drawings may be understood in conjunction with FIGS. 3A-3F, which show particularly the TCO insulation shell and lead wire, and FIG. 6, which is an explode view of the TMOV 200. The TMOV 200 has features that mitigate the fire hazards caused by the prior art TMOV 100. Like the prior art TMOV 100, the TMOV 200 is a radial leaded disc. The TMOV 200 has high reliable thermal protection designed to cut the circuit with high reliability under abnormal overvoltage conditions.

Like the prior art TMOV 100, the TMOV 200 includes two electrodes and an MOV body 202, with one electrode 204 being visible in the figures. The TMOV 200 does not have ceramic resistors as does the TMOV 100. The MOV body 202 is sandwiched between two electrodes, similar to what is shown in FIG. 1B.

The TMOV 200 features lead wires 206*a-c* extending radially outward from the MOV body 202 (collectively, "lead wires 206"). A first lead wire 206*a* extends downward on one side (left side in FIGS. 2E-2F) of the MOV body 202, a second lead wire 206*b* extends downward in the center of the MOV body, and a third lead wire 206*c* extends downward on the other side (right side in FIGS. 2E-2F) of the MOV body, with the second lead wire being disposed between the first and third lead wires. The lead wire 206*a* connects to the not visible electrode, while the lead wires 206*b* and 206*c* connect to the electrode 204.

In exemplary embodiments, the lead wire 206*b*, also known herein as a phosphor copper wire, is designed to reliably cut off connection to the electrode 204 and the lead wire 206*c*, in contrast to the prior art TMOV 100, thus successfully disabling the circuit with high reliability under abnormal overvoltage conditions. The phosphor copper wire 206*b* is shown from two different angles, in FIG. 2A and FIG. 2B, as part of the TMOV 200. In exemplary embodiments, the lead wire 206*b* is a phosphor copper wire made from bronze C5191 or steel. The lead wire 206*b* has a vertical portion 208, a curved portion 210, and an end portion 212. The curved portion 210 is connected to the vertical portion 208 and looks like the letter C. The vertical portion 208 extends radially outward from the electrode 204. The end portion 212 is to be connected to a connecting portion 220 of lead wire 206*c*, as shown in FIGS. 2E and 2F. In exemplary embodiments, the connecting portion 220 of lead wire 206*c* is attached/affixed to the end portion 212 of lead wire 206*b* using a low melting point solder.

In exemplary embodiments, shown in FIG. 2D, the TMOV 200 also features a thermal cut-off (TCO) insulation shell 214 having a protrusion 216*a* and a protrusion 216*b* (collectively, "protrusion(s) 216"). The protrusion 216*a* extends circumferentially around most, but not all, of an edge portion of the TCO insulation shell 214. The protrusion 216*b* extends circumferentially around approximately half of and is interior to the TCO insulation shell 214. The protrusion 216*a* is a distance, $d_2$, from the protrusion 216*b*. In exemplary embodiments, the TCO insulation shell 214 is made of alumina, $Al_20_3$, or plastic. Perspective views of the TCO insulation shell 214 are shown in FIGS. 3C and 3F, as well as FIG. 6.

In exemplary embodiments, the distance, $d_2$, is approximately the diameter of the curved portion 210 of the lead wire 206*b*. When the lead wire 206*b* is inserted into the TCO insulation shell 214, a significant amount of the curved portion 210 is surrounded by the protrusions 216, with protrusion 216*a* being external to the curved portion and protrusion 216*b* being internal to the curved portion. The TCO insulation shell 214 has an aperture 218, which enables the end portion 212 of the lead wire 206*b* to be connected to the electrode 204 and to the connecting portion 220 of the lead wire 206*c*. Once assembled, the lead wire 206*b* is on one side of the TCO insulation shell 214 (in front of, in FIG. 2E) and the lead wire 206*b* is on the other side of the TCO insulation shell (behind, in FIG. 2E).

While in a normal state, as illustrated in FIG. 2E, the lead wire 206*b* and 206*c* are both connected to each other and are connected to the electrode 204. A current flowing through the TMOV 200 travels from the lead wire 206*c*, through the electrode 204, through the MOV body 202, to the other electrode on the backside of the MOV body (not shown), and finally to the lead wire 206*a*, and vice-versa.

Figure 6:
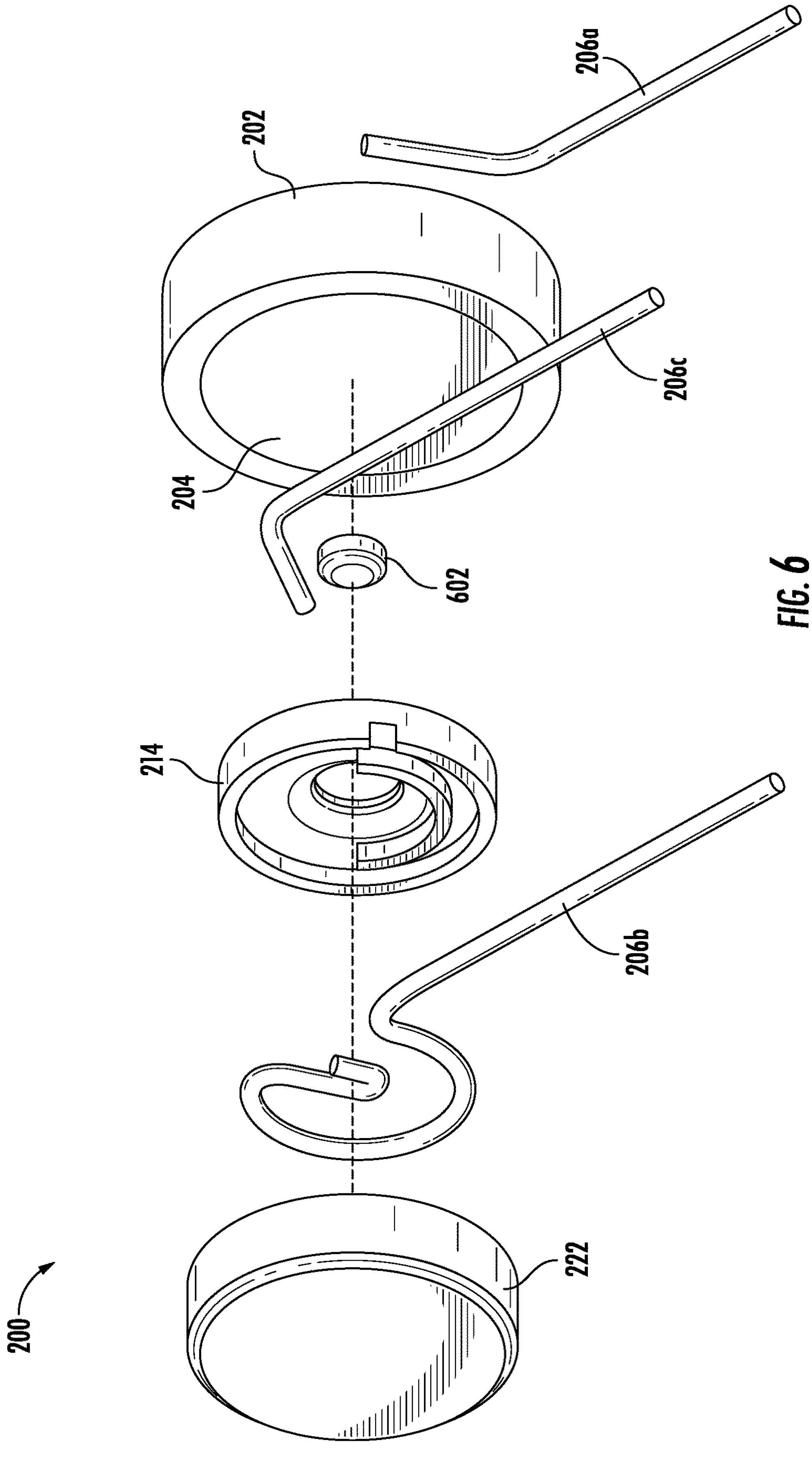
FIG. 6 is an exploded view diagram of the enhanced TMOV of FIGS. 2A-2G, in accordance with exemplary embodiments.

In exemplary embodiments, as shown in FIG. 2G, the TMOV 200 includes a cover 222 to be placed over the components illustrated in FIGS. 2E and 2F. Like the TCO insulation shell 214, in exemplary embodiments, the cover 222 is made of alumina, $Al_20_3$, or plastic. In exemplary embodiments, the melting point for the cover 222 and the TCO insulation shell 214 is 200° C. As shown in FIG. 6, a low-temperature solder 602 is inserted into the aperture 218 of the TCO insulation shell 214. The low-temperature solder 602 helps to secure the lead wire 206*b* to the electrode 204.

During sustained overvoltage conditions, the lead wire 206*b* changes position, resulting in an open circuit within the TMOV 200. FIG. 2E shows the lead wire 206*b* in a first position, with the curved portion 210 disposed between the protrusions 216 of the TCO insulation shell 214 and the end portion 212 soldered to the lead wire 206*c* and the electrode 204. When the overvoltage condition occurs, the lead wire 206*b* is in a second position, as illustrated in FIG. 2F, with the end portion 212 disconnecting from the lead wire 206*c* and the electrode 204. Like the curved portion 210, the end portion 212 is adjacent the protrusion 216*a* and contained within the TCO insulation shell 214. Further, the curved portion 216 and end portion 212 of the lead wire 206*b* is disposed away from the aperture 218 and thus not touching the electrode 204.

Figure 3A:
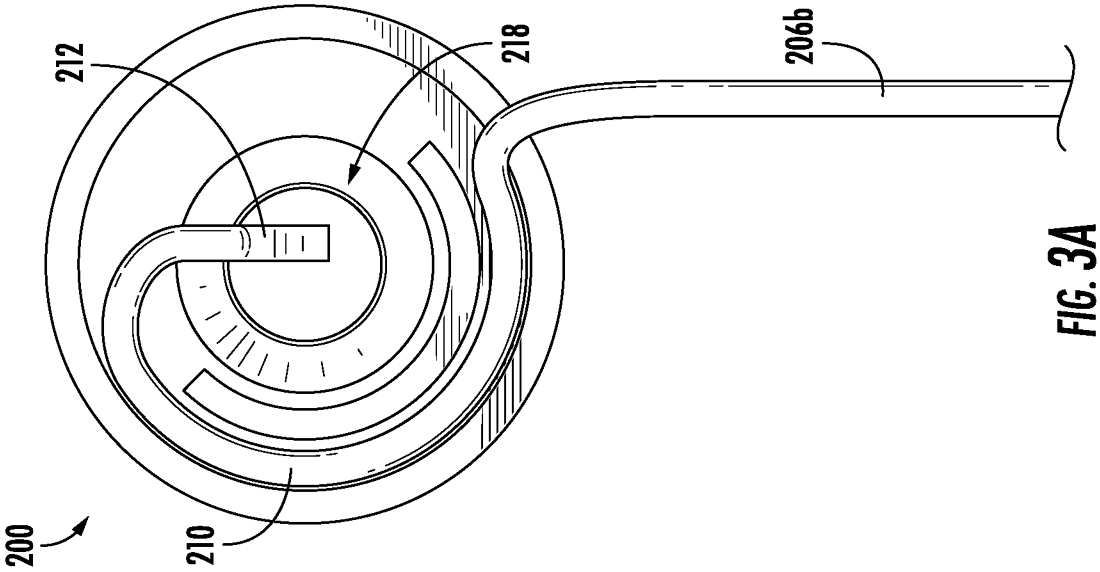
FIGS. 3A-3F are diagrams illustrating the enhanced TMOV of FIGS. 2A-2G, in accordance with exemplary embodiments.
Figure 3B:
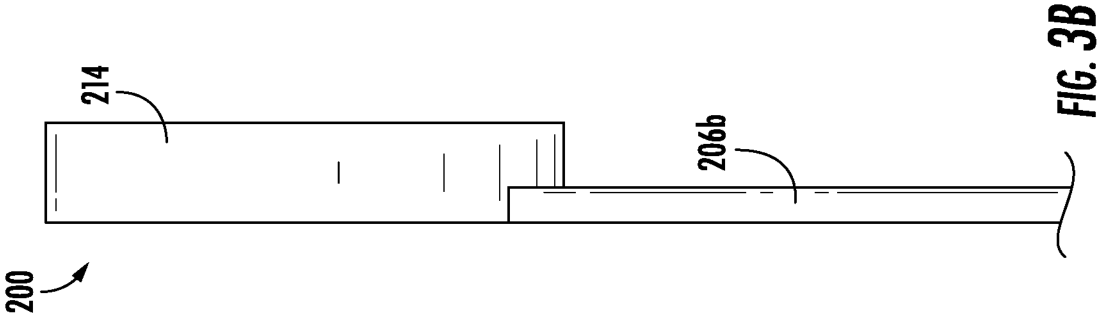
Figure 3C:
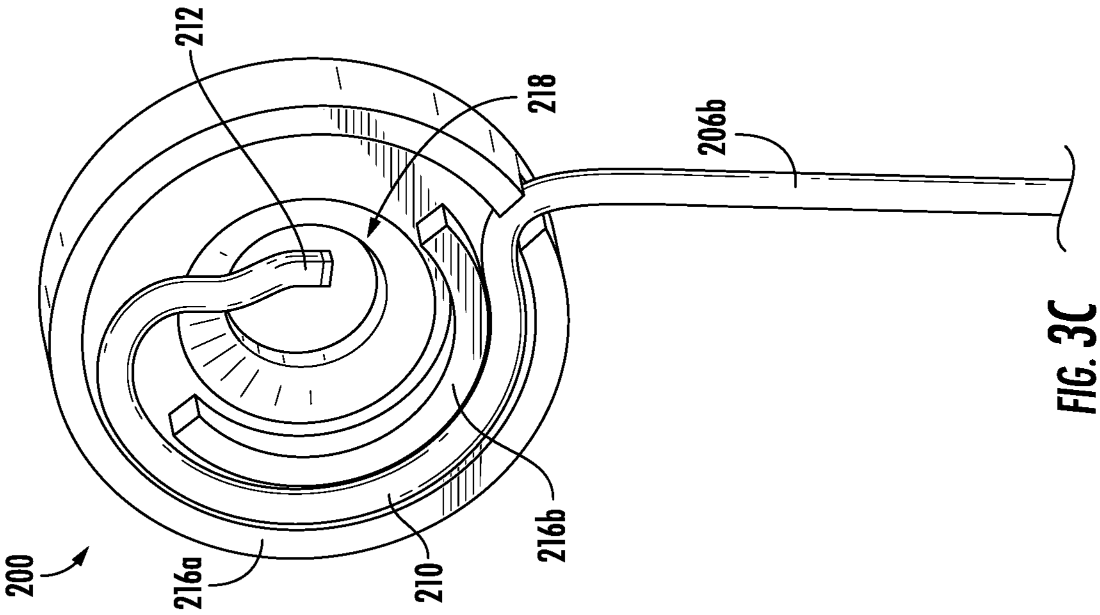
Figure 3F:
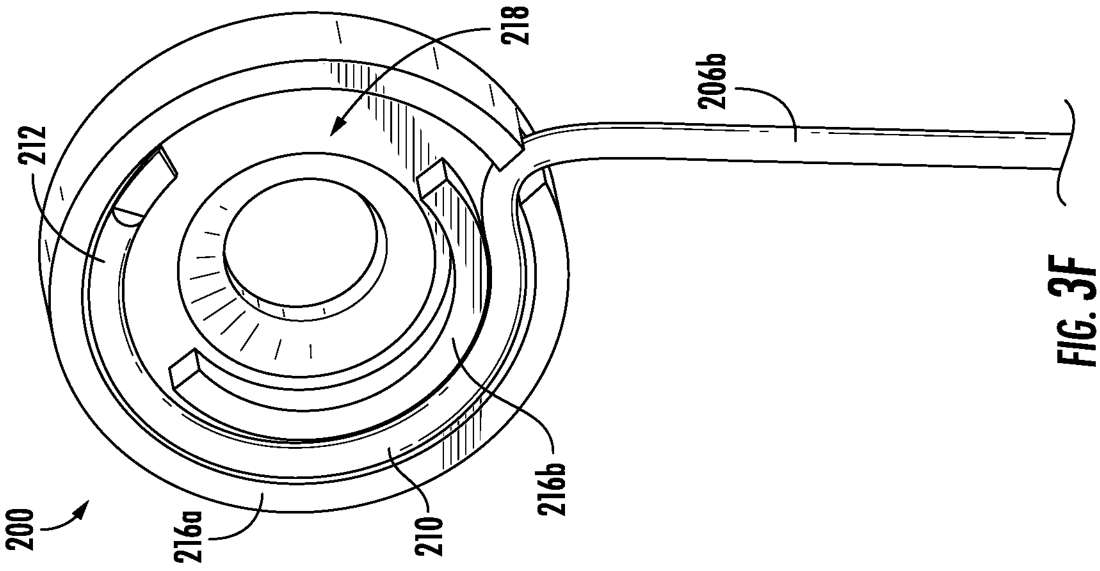
Figure 3E:
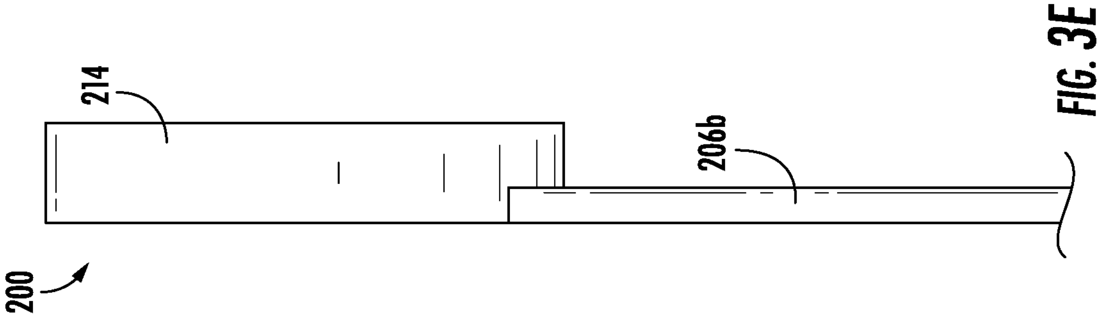
Figure 3D:
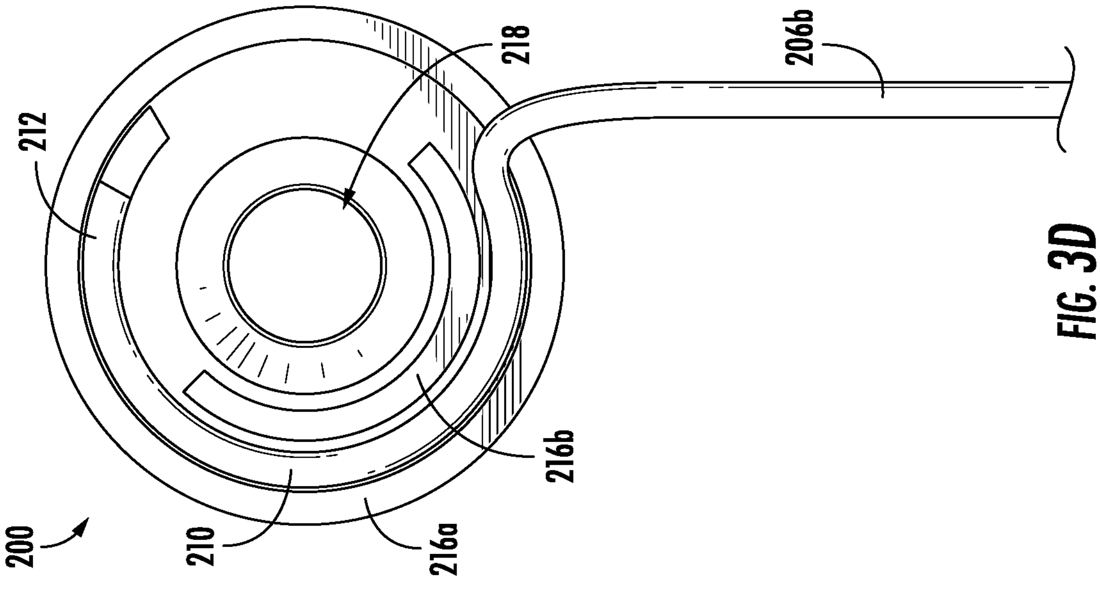

FIGS. 3A-3F are representative drawings of the TMOV 200 of FIGS. 2A-2G, particularly illustrating the TCO insulation shell 214 and the lead wire 206*b*, according to exemplary embodiments. FIG. 3A is a plan view, FIG. 3B is a side view, and FIG. 3C is a perspective view of the TMOV 200 in the normal state; FIG. 3D is a plan view, FIG. 3E is a side view, and FIG. 3F is a perspective view of the TMOV 200 after the abnormal condition has occurred. The perspective view of the TMOV 200 in FIG. 3C shows how the lead wire 206*b* is bent inward so as to fit through the aperture 218 of the TCO insulation shell 214 and thus be connected to the electrode 204. Following the abnormal overvoltage event (FIG. 3F), the low temperature solder paste melts, and the end portion 212 of the lead wire 206*b* moves from the aperture 218 to the circumferential edge of the TCO insulation shell 214, and away from the electrode 204. The lead wire 206*b* is thus able to rebound from the electrode 204, thus opening the circuit in the TMOV 200. The side views of FIGS. 3B and 3E show that the TCO insulation shell 214 is approximately double the diameter of the lead wire 206*b*.

Figure 4A:
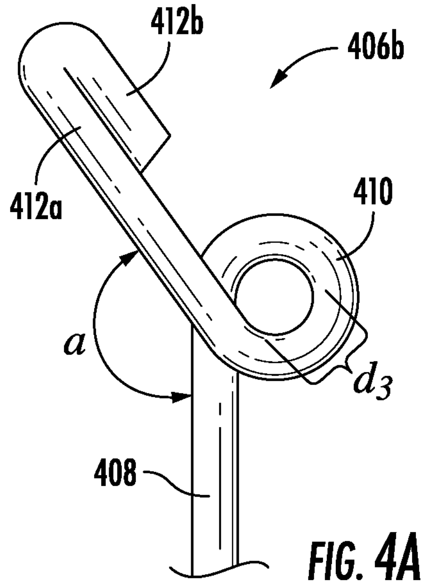
FIGS. 4A-4F are diagrams illustrating a second enhanced TMOV, in accordance with exemplary embodiments.
Figure 4B:
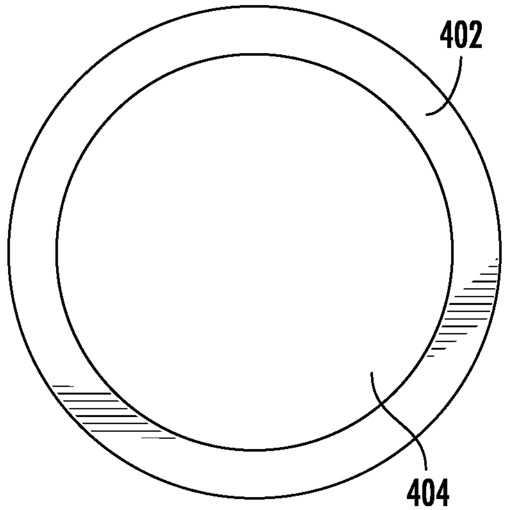
Figure 4C:
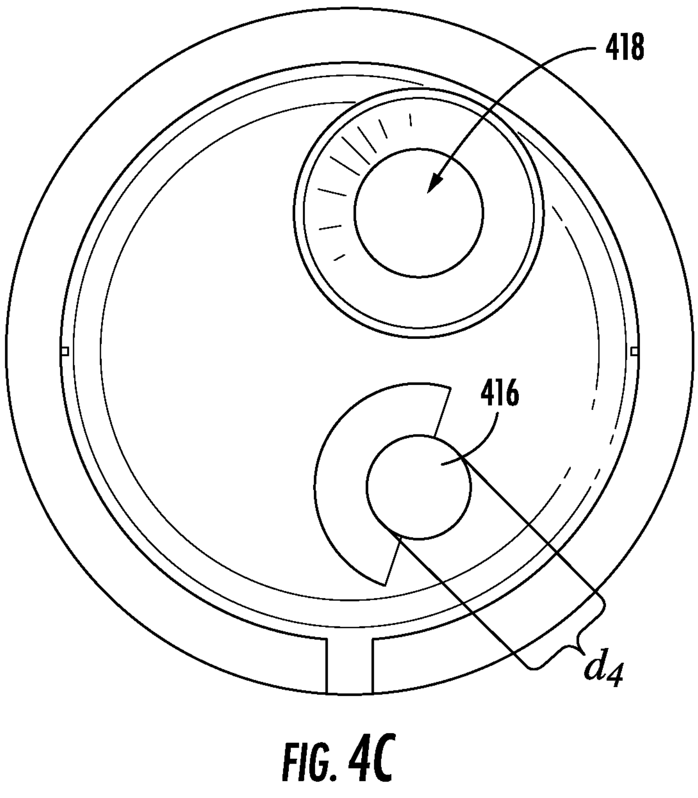
Figure 4E:
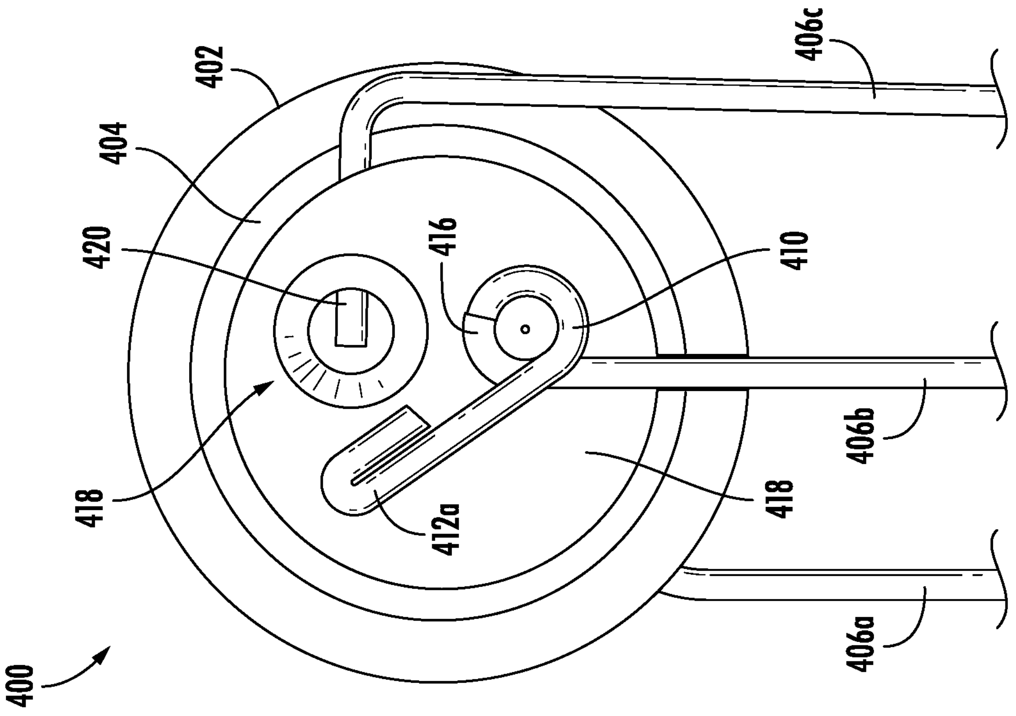
Figure 4D:
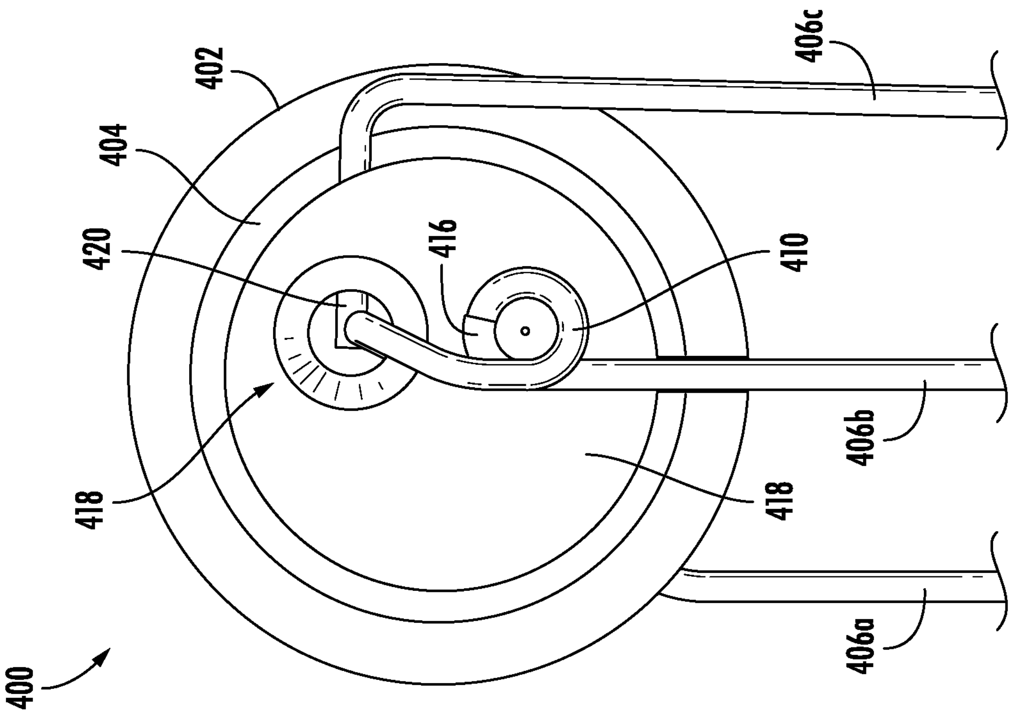
Figure 4F:
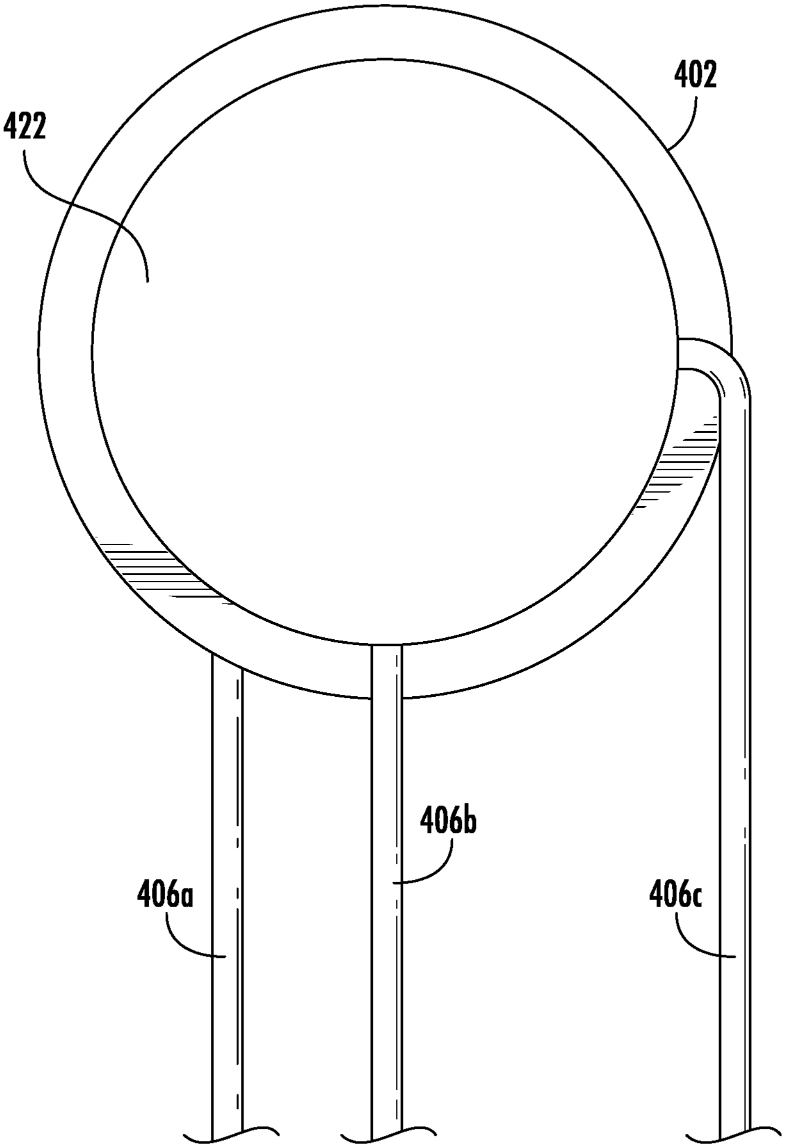

FIGS. 4A-4F are representative drawings of a TMOV 400, according to exemplary embodiments. FIG. 4A is a plan view of the phosphorus copper wire, FIG. 4B is a plan view of the MOV, FIG. 4C is a plan view of an TCO insulation shell, and FIG. 4F is a plan view of a lid 422, all of which are used in the enhanced TMOV 400; FIG. 4D is a plan view of the TMOV 400 before the solder joint is broken, and FIG. 4E is a plan view of the TMOV 400 after the solder joint is broken. These drawings may be understood in conjunction with FIGS. 5A-5F, which show particularly the TCO insulation shell and lead wire, and FIG. 7, which is an explode view of the TMOV 400. The TMOV 400 has features that mitigate the fire hazards caused by the prior art TMOV 100. Like the prior art TMOV 100 and the TMOV 200, the TMOV 400 is a radial leaded disc. The TMOV 400 has high reliable thermal protection designed to cut the circuit with high reliability under abnormal overvoltage conditions.

Like the prior art TMOV 100, the TMOV 400 includes two electrodes and an MOV body 402, with and one electrode 404 being visible in the figures. Like the TMOV 200 and in contrast to the TMOV 100, the TMOV 400 has no ceramic resistors. The MOV body (not shown) is sandwiched between two electrodes, similar to what is shown in FIG. 1B.

The TMOV 400 features lead wires 406*a*-*c* extending radially outward from the MOV body 402 (collectively, "lead wires 406"). A first lead wire 406*a* extends downward on one side (left side in FIGS. 4D-4E) of the MOV body 402, a second lead wire 406*b* extends downward in the center of the MOV body, and a third lead wire 406*c* extends downward on the other side (right side in FIGS. 4D-4E) of the MOV body, with the second lead wire being disposed between the first and third lead wires. The lead wire 406*a* connects to the not visible electrode, while the lead wires 406*b* and 406*c* connect to the electrode 404.

In exemplary embodiments, the lead wire 406*b*, also known herein as a phosphor copper wire, is designed to reliably cut off connection to the electrode 404 and the lead wire 406*c*, in contrast to the prior art TMOV 100, thus successfully disabling the circuit with high reliability under abnormal overvoltage conditions. In exemplary embodiments, the lead wire 406*b* is a phosphor copper wire made from bronze C5191 or steel. The lead wire 406*b* has a vertical portion 408, a circular portion 410, and end portions 412*a* and 412*b* (collectively, "end portion(s) 412"). The circular portion 410 is a portion of the lead wire 406*b* that has been bent until forming a torus or donut shape. In exemplary embodiments, the end portion 412 is at an angle, α, from the vertical portion 408 of the lead wire 406*b*. In exemplary embodiments, end portion 412*a* is adjacent and parallel to end portion 412*b*.

The end portions 412 are to be connected to a connecting portion 420 of lead wire 406*c*, as shown in FIGS. 4D and 4E. In exemplary embodiments, the connecting portion 420 of lead wire 406*c* is attached/affixed to the end portion 412 of lead wire 406*b* using a low melting point solder.

Figure 7:
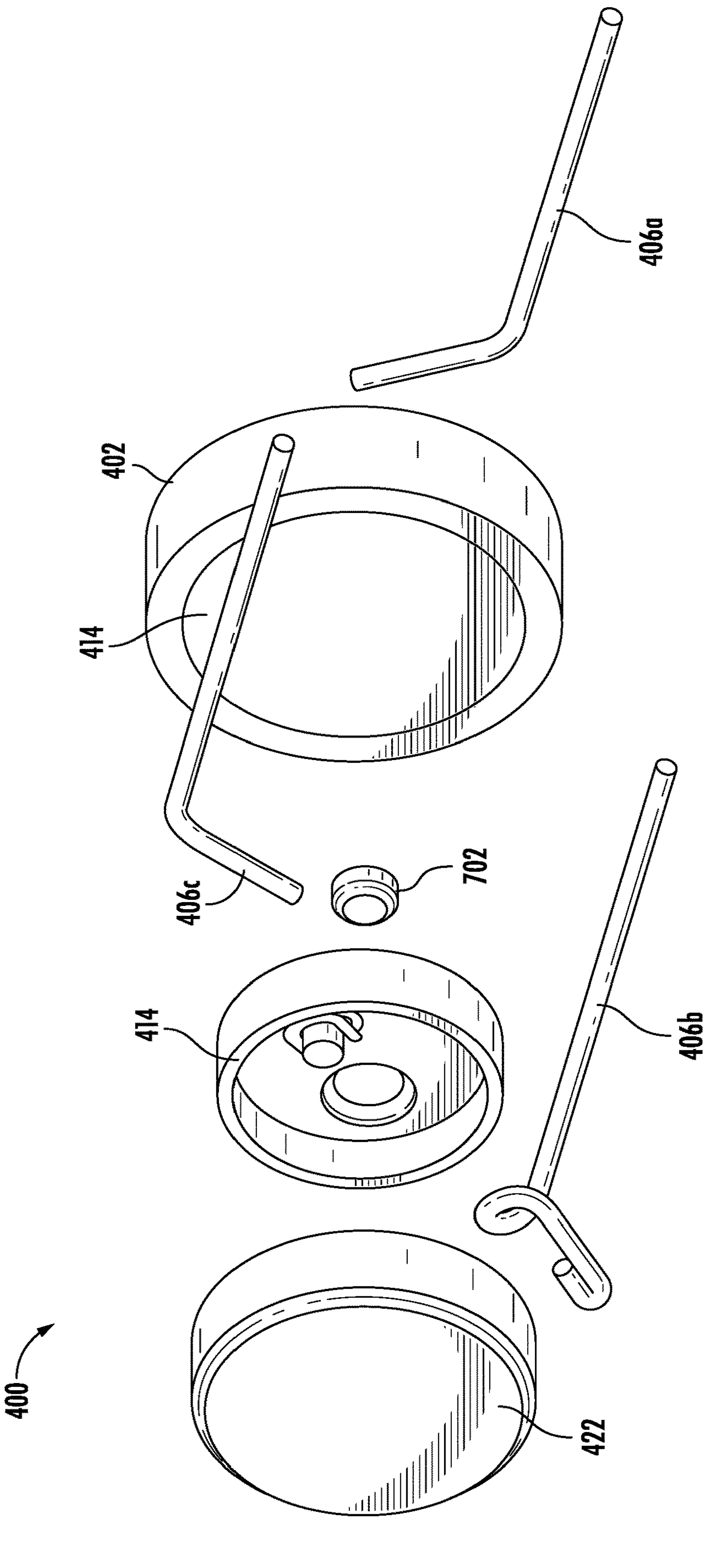
FIG. 7 is an exploded view diagram of the enhanced TMOV of FIGS. 4A-4F, in accordance with exemplary embodiments.

In exemplary embodiments, shown in FIG. 4C, the TMOV 400 also features a TCO insulation shell 414 having a protrusion 416 and an aperture 418. Also visible in the perspective drawings of FIGS. 5C and 5F and the exploded view of FIG. 7, the protrusion 416 is a cylindrical structure below the aperture 418 that enables the circular portion 410 of lead wire 406*b* to surround the protrusion 416. Accordingly, a diameter, d3, of the circular portion 410 is approximately the same as a diameter, d4, of the protrusion 416, that is, d3~d4. The protrusion 416 thus "holds" the lead wire 406*b* in place in the TCO insulation shell 414. In exemplary embodiments, the TCO insulation shell 414 is made of alumina, Al203, or plastic. Perspective views of the TCO insulation shell 414 are shown in FIGS. 5C, and 5F, and 7.

When the lead wire 406*b* is inserted into the TCO insulation shell 414, the circular portion 410 surrounds protrusion 416. The TCO insulation shell 414 has an aperture 418, which enables the end portion 412 of the lead wire 406*b* to be connected to the electrode 404 and to the connecting portion 420 of the lead wire 406*c*. Once assembled, in some embodiments, the lead wire 406*b* is on one side of the TCO insulation shell 414 (in front of, in FIG. 4D) and the lead wire 406*b* is on the other side of the TCO insulation shell (behind, in FIG. 4D). In other embodiments, the lead wire 406*b* and the lead wire 406*c* are both on the same side of the TCO insulation shell, as in FIGS. 5A-5F.

While in a normal state, as illustrated in FIG. 4D, the lead wire 406*b* and 406*c* are both connected to each other and are connected to the electrode 404. A current flowing through the TMOV 400 travels from the lead wire 406*c*, through the TCO insulation shell 414, through the electrode 404, through the MOV body (not shown), to the other electrode on the backside of the MOV body (not shown), and finally to the lead wire 406*a*, and vice-versa.

In exemplary embodiments, as shown in FIG. 4F, the TMOV 400 includes a cover 422 to be placed over the components illustrated in FIGS. 4D and 4E. Like the TCO insulation shell 414, in exemplary embodiments, the cover 422 is made of alumina, $Al_20_3$, or plastic. In exemplary embodiments, the melting point for the cover 422 and the TCO insulation shell 414 is 200° C.

During sustained overvoltage conditions, the lead wire 406*b* changes position, resulting in an open circuit within the TMOV 400. FIG. 4D shows the lead wire 406*b* in a first position, with the circular portion 410 disposed around the protrusion 416 of the TCO insulation shell 414 and the end portion 412 soldered to the lead wire 406*c* and the electrode 404. When the overvoltage condition occurs, the lead wire 406*b* is in a second position, as illustrated in FIG. 4E, with the end portion 412 disconnecting from the connecting portion 420 of lead wire 406*c* and from the electrode 404. Further, in exemplary embodiments, the end portion 412 is not near the aperture 418.

Figure 5A:
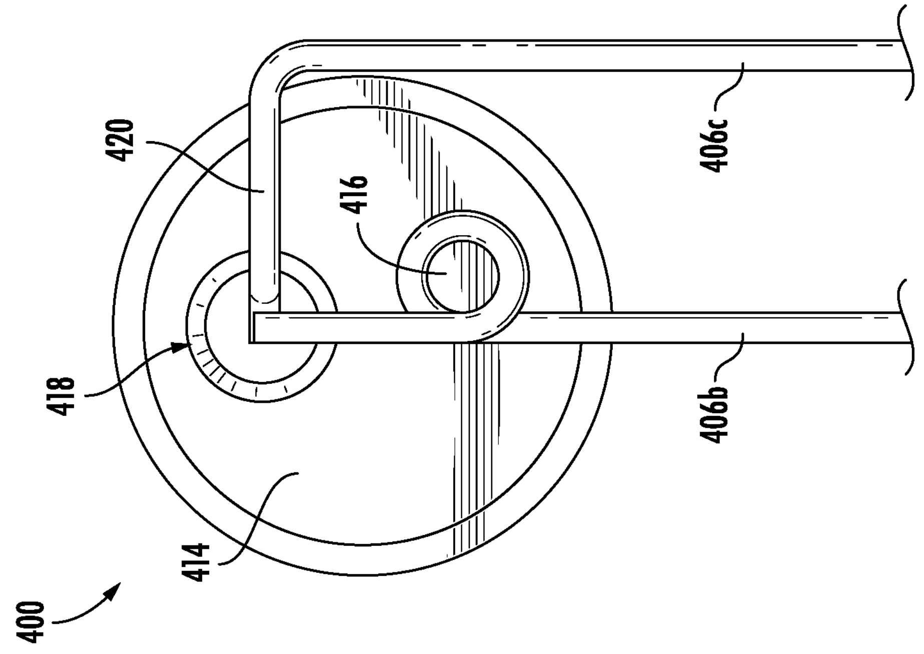
FIGS. 5A-5F are diagrams illustrating the enhanced TMOV of FIGS. 4A-4F, in accordance with exemplary embodiments.
Figure 5B:
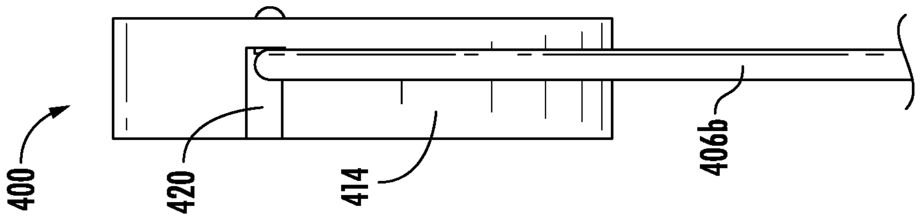
Figure 5C:
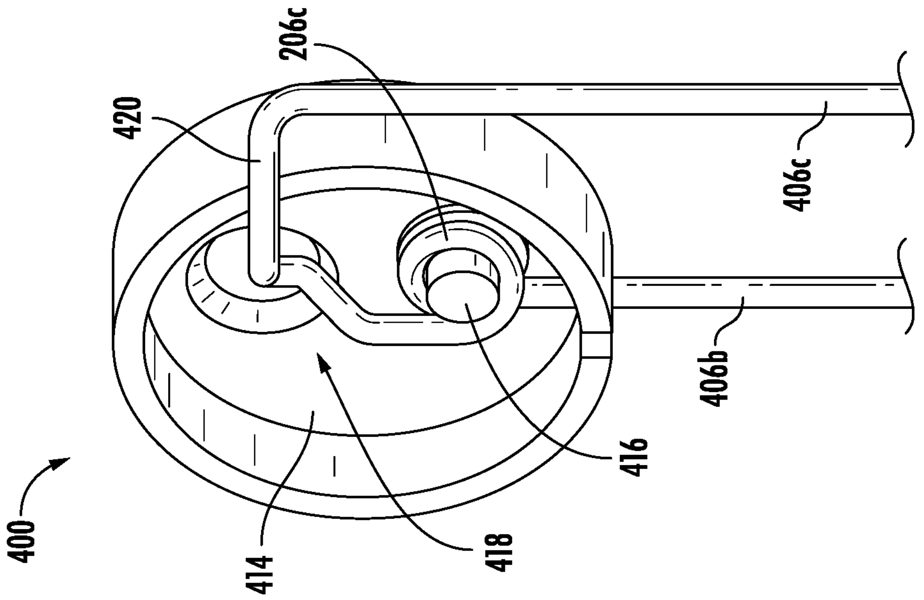
Figure 5D:
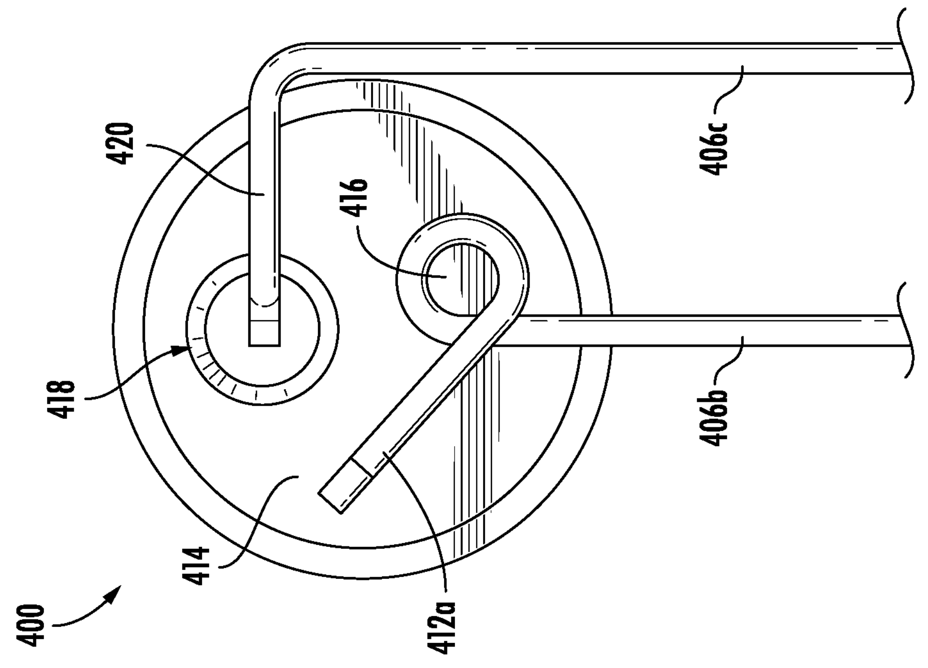
Figure 5E:
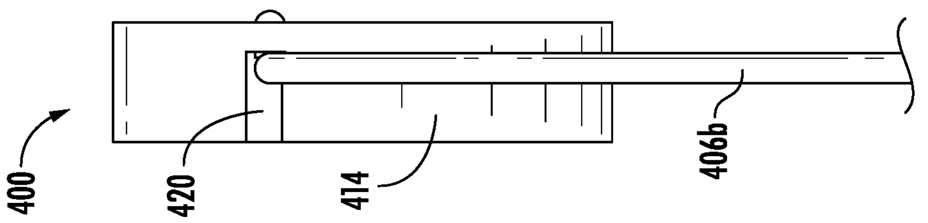
Figure 5F:
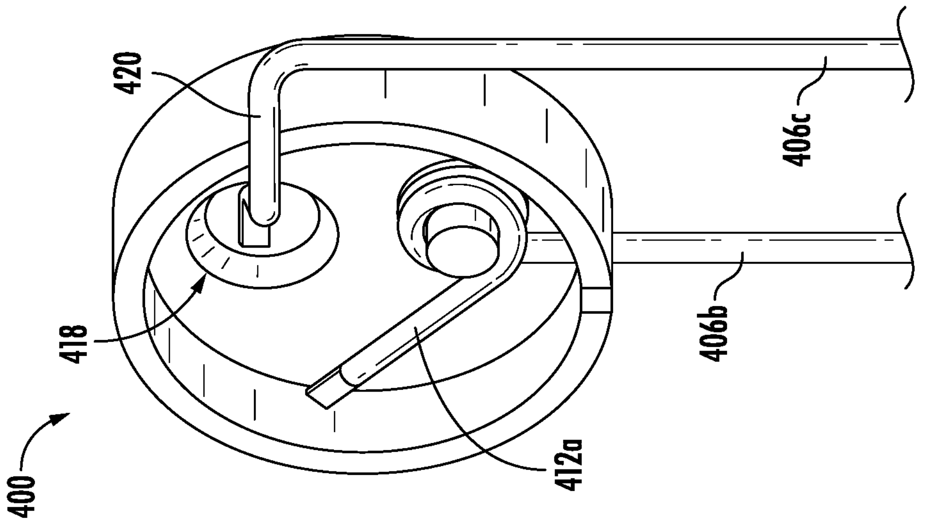

FIGS. 5A-5F are representative drawings of the TMOV 400 of FIGS. 4A-4E, according to exemplary embodiments. FIG. 5A is a plan view, FIG. 5B is a side view, and FIG. 5C is a perspective view of the TMOV 400 in the normal state; FIG. 5D is a plan view, FIG. 5E is a side view, and FIG. 5F is a perspective view of the TMOV 400 after the abnormal condition has occurred.

The perspective view of the TMOV 400 in FIG. 5C shows how the lead wire 406*b* is bent inward so as to fit through the aperture 418 of the TCO insulation shell 414 and thus be connected to the electrode 404. Following the abnormal overvoltage event (FIG. 5F), the low temperature solder paste melts, and the end portion 412 of the lead wire 406*b* moves from the aperture 418 to the circumferential edge of the TCO insulation shell 414, and away from the electrode 404. The lead wire 406*b* is thus able to rebound from the electrode 404, thus opening the circuit in the TMOV 400. The side views of FIGS. 5B and 5E show that the TCO insulation shell 414 is approximately double the diameter of the lead wire 406*b*. As shown in FIG. 7, a low-temperature solder 702 is inserted into the aperture 418 of the TCO insulation shell 414. The low-temperature solder 702 helps to secure the lead wire 406*b* to the electrode 404.

In exemplary embodiments, the TMOV 200 and TMOV 400 are fasts and highly reliable overvoltage devices that have good thermal protection performance. The circuit inside the TMOVs 200 and 400 are able to be opened, mitigating the risk of a fire. Further, the TMOV 200 and TMOV 400 are a small size and easy to assemble. Although the enhanced TCO insulation shells 214/414 and lead wires 206*b*/406*b* are described with respect to a TMOV, these features may also be implemented in an MOV that is not thermally protected.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. A metal oxide varistor comprising:

a metal oxide varistor body comprising a crystalline microstructure featuring zinc oxide mixed with one or more other metal oxides;

a first electrode disposed adjacent a first side of the metal oxide varistor body, wherein the first electrode is coupled to a first radial lead;

a second electrode disposed adjacent a second side of the metal oxide varistor body, wherein the second electrode is coupled to a second radial lead, wherein the second radial lead comprises a circular portion; and a thermal cut-off insulation shell disposed adjacent the second electrode, the thermal cut-off insulation shell comprising a cylindrical protrusion, wherein the circular portion fits around the cylindrical protrusion.

2. The metal oxide varistor of claim 1, the second radial lead further comprising a vertical portion extending radially outward from the metal oxide varistor body, wherein the vertical portion is connected to the circular portion.

3. The metal oxide varistor of claim 2, the second radial lead further comprising an end portion, wherein the end portion is affixed to the second electrode using a soldering paste.

4. The metal oxide varistor of claim 3, wherein the end portion moves away from the second electrode once the soldering paste melts.

5. The metal oxide varistor of claim 1, wherein the second radial lead is a phosphor copper wire.

6. The metal oxide varistor of claim 1, wherein the second radial lead comprises bronze C5191.

7. The metal oxide varistor of claim 1, wherein the second radial lead comprises steel.

8. The metal oxide varistor of claim 1, wherein the thermal cut-off insulation shell comprises Al2O3.

9. The metal oxide varistor of claim 1, wherein the thermal cut-off insulation shell comprises plastic.

* * * * *